(12) United States Patent
Ye et al.

(10) Patent No.: US 11,245,841 B2
(45) Date of Patent: Feb. 8, 2022

(54) METHOD FOR MARKING TARGET POSITION OF GIMBAL, GIMBAL, AND PHOTOGRAPHING DEVICE

(71) Applicant: SZ DJI TECHNOLOGY CO., LTD., Shenzhen (CN)

(72) Inventors: Fangming Ye, Shenzhen (CN); Tao Zhao, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 17/184,522

(22) Filed: Feb. 24, 2021

(65) Prior Publication Data

US 2021/0203839 A1    Jul. 1, 2021

Related U.S. Application Data

(63) Continuation of application No. PCT/CN2018/102677, filed on Aug. 28, 2018.

(51) Int. Cl.
*H04N 5/232*         (2006.01)

(52) U.S. Cl.
CPC ..... *H04N 5/23222* (2013.01); *H04N 5/23258* (2013.01); *H04N 5/23287* (2013.01)

(58) Field of Classification Search
CPC ........... H04N 5/23222; H04N 5/23258; H04N 5/23287; H04N 5/232939; F16M 11/12; F16M 11/2071; F16M 11/10; F16M 13/02; F16M 2200/022; F16M 11/18; F16M 2200/024; A47F 5/08; A47F 5/10; A47F 7/00; B44C 5/02; F16C 11/103; G05D 3/12; G03B 17/56

USPC ....................................................... 348/208.2
See application file for complete search history.

(56) References Cited

U.S. PATENT DOCUMENTS

| | | | |
|---|---|---|---|
| 9,858,023 B2* | 1/2018 | Tao | G09B 9/48 |
| 10,310,292 B2* | 6/2019 | Tian | G02B 27/646 |
| 10,465,840 B2* | 11/2019 | Gubler | F16M 11/18 |
| 10,709,311 B2* | 7/2020 | Schoonbaert | A61B 1/00052 |
| 11,060,658 B2* | 7/2021 | Griffin | F16M 11/2007 |
| 2011/0054717 A1* | 3/2011 | Yamauchi | G05D 1/0038 701/2 |
| 2014/0270744 A1* | 9/2014 | Webb | H04N 5/23261 396/55 |
| 2015/0285660 A1* | 10/2015 | Linton | G01C 21/18 73/1.77 |
| 2017/0010611 A1* | 1/2017 | Tao | G06F 3/147 |

(Continued)

FOREIGN PATENT DOCUMENTS

| | | |
|---|---|---|
| CN | 103149939 A | 6/2013 |
| CN | 106525074 A | 3/2017 |
| WO | 2004067432 A2 | 8/2004 |

OTHER PUBLICATIONS

The World Intellectual Property Organization (WIPO) International Search Report for PCT/CN2018/102677 dated Jun. 4, 2019 6 pages.

*Primary Examiner* — Pritham D Prabhakher
(74) *Attorney, Agent, or Firm* — Anova Law Group, PLLC (57) ABSTRACT

A method for marking a target position of a gimbal includes obtaining a current offset angle between a base of the gimbal and an axis arm of the gimbal during rotation of the base, determining a final target position of the gimbal when the base rotates to a current position according to the current offset angle, and displaying the final target position.

18 Claims, 7 Drawing Sheets

(56) References Cited

U.S. PATENT DOCUMENTS

| | | |
|---|---|---|
| 2017/0089507 A1 | 3/2017 | King et al. |
| 2017/0227162 A1* | 8/2017 | Saika .................. F16M 11/041 |
| 2018/0113462 A1* | 4/2018 | Fenn .................. F16M 11/2028 |
| 2018/0120585 A1* | 5/2018 | Tian ..................... G02B 27/646 |
| 2018/0135798 A1* | 5/2018 | Griffin ..................... G05B 6/02 |
| 2018/0274720 A1* | 9/2018 | Gubler .................. F16M 11/18 |
| 2019/0082932 A1* | 3/2019 | Schoonbaert ...... A61B 1/00048 |

* cited by examiner

METHOD FOR MARKING TARGET POSITION OF GIMBAL, GIMBAL, AND PHOTOGRAPHING DEVICE

CROSS-REFERENCE TO RELATED APPLICATION

This application is a continuation of International Application No. PCT/CN2018/102677, filed Aug. 28, 2018, the entire content of which is incorporated herein by reference.

TECHNICAL FIELD

The present disclosure relates to a technical field of gimbal and, in particular, to a method for marking a target position of a gimbal, a gimbal, and a photographing device.

BACKGROUND

Gimbal can carry loads, and a stabilization gimbal can stabilize an attitude of the carried load, that is, keep the attitude of the load in a substantially stationary state during movement. In addition, the stabilization gimbal can control the movement of the load. For example, a photographing device is the load. After the photographing device is mounted at the stabilization gimbal, the stabilization gimbal can stabilize a shooting direction of the photographing device, so as to ensure that the photographing device shoots a stable image during the movement.

A user can hold a stabilization gimbal to move, so that the gimbal moves in a direction of the user's movement. When the user operates the stabilization gimbal to move, a gimbal base rotates. Usually, in order to prevent the gimbal from following the gimbal base too tightly and causing images captured by the photographing device to shake strongly, the gimbal starts and stops slowly to eliminate an angle increment with the base, so as to achieve a following movement. However, the above manner may cause a positional delay between the movement of the gimbal and the movement of the user. When the user stops moving, the gimbal is still moving, so the user cannot accurately predict a target position of the gimbal.

SUMMARY

In accordance with the disclosure, there is provided a method for marking a target position of a gimbal, which includes obtaining a current offset angle between a base of the gimbal and an axis arm of the gimbal during rotation of the base, determining a final target position of the gimbal when the base rotates to a current position according to the current offset angle, and displaying the final target position.

Also in accordance with the disclosure, there is provided a method for marking a target position of a gimbal, which includes, during rotation of a base of the gimbal, obtaining a current offset angle between the base and a photographing device mounted at the gimbal, determining a final target position of the gimbal when the base rotates to a current position according to the current offset angle, and displaying the final target position.

Also in accordance with the disclosure, there is provided a gimbal including a base, an axis arm, and a processor communicatively connected to the base and the axis arm, and configured to obtain a current offset angle between the base and the axis arm during rotation of the base, determine a final target position of the gimbal when the base rotates to a current position according to the current offset angle, and display the final target position.

BRIEF DESCRIPTION OF THE DRAWINGS

To more clearly illustrate the technical solution of the present disclosure, the accompanying drawings used in the description of the disclosed embodiments are briefly described below. The drawings described below are merely some embodiments of the present disclosure. Other drawings may be derived from such drawings by a person with ordinary skill in the art without creative efforts.

DETAILED DESCRIPTION OF THE EMBODIMENTS

The technical solutions in the example embodiments of the present disclosure will be described clearly with reference to the accompanying drawings. The described embodiments are some of the embodiments of the present disclosure, rather than all the embodiments. Based on the embodiments of the present disclosure, all other embodiments obtained by a person of ordinary skill in the art without creative efforts shall fall within the scope of the present disclosure.

Figure 1:
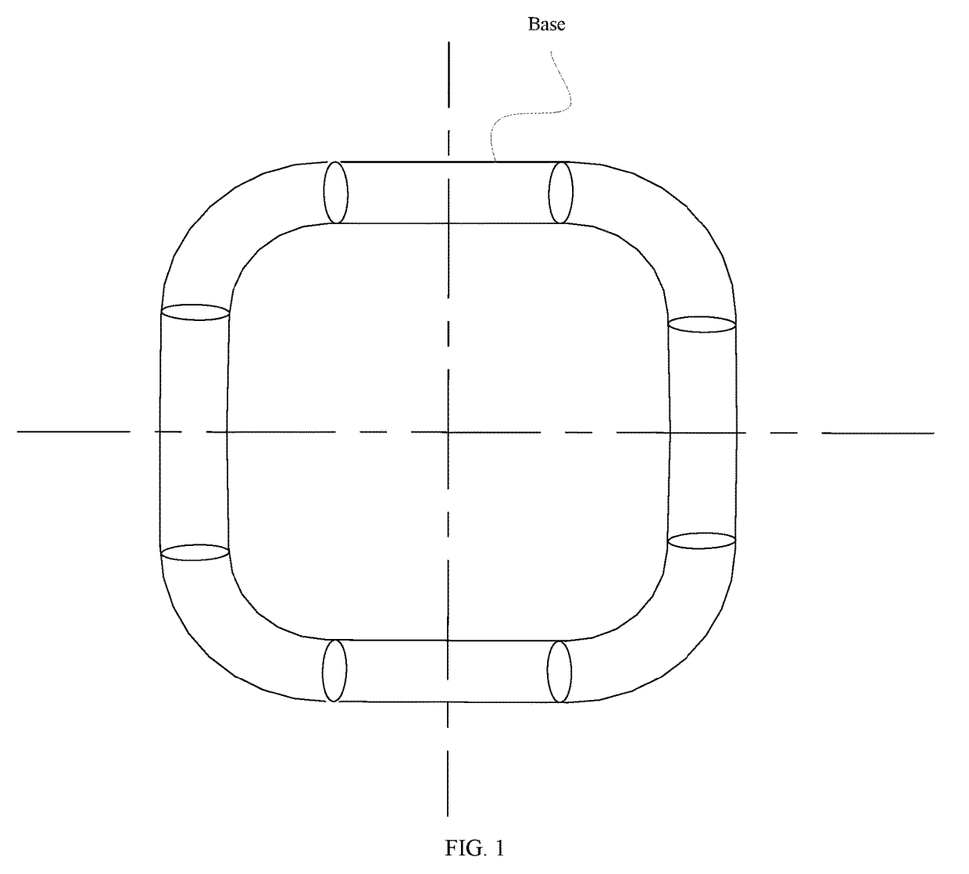
FIG. 1 is a schematic structural diagram of a gimbal base according to an embodiment of the disclosure.
Figure 2:
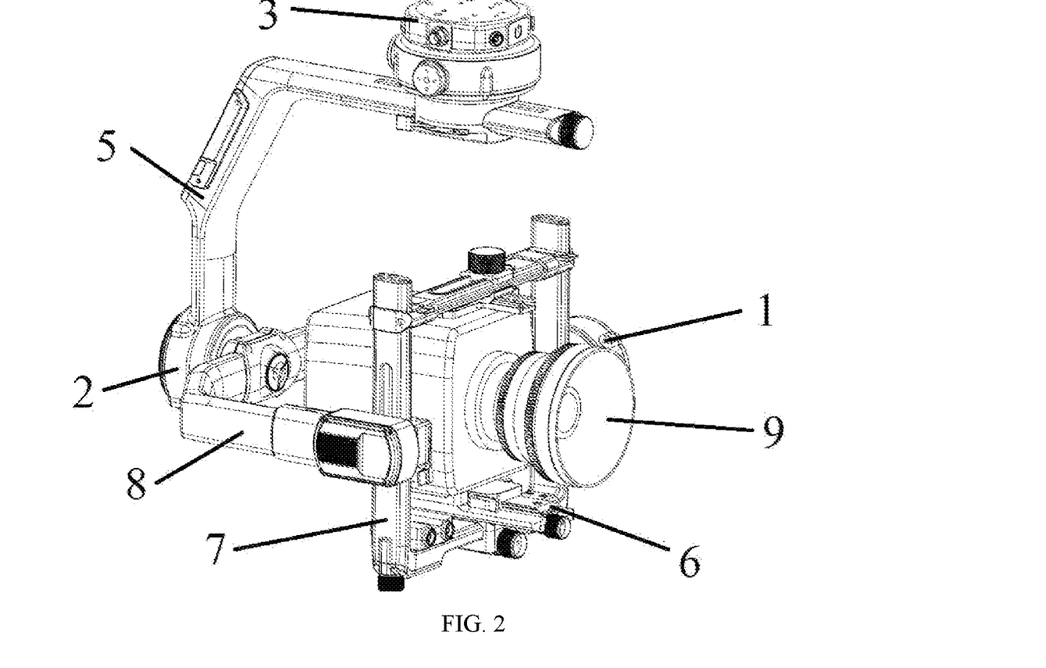
FIG. 2 is a schematic structural diagram of a gimbal according to an embodiment of the disclosure.

The embodiments of the present disclosure provide a method for marking a target position of a gimbal, a gimbal, and a photographing device. The gimbal can be a stabilization gimbal, and the stabilization gimbal can be applied to a movable platform, such as an unmanned aerial vehicle (UAV). FIG. 1 is a schematic structural diagram of a gimbal base according to an embodiment of the disclosure, and FIG. 2 is a schematic structural diagram of a gimbal according to an embodiment of the disclosure. As shown in FIGS. 1 and 2, in actual use, a user can operate the base to drive the gimbal to move. The gimbal includes, but is not limited to, three axis motors (including a pitch-axis motor 1, a roll-axis motor 2, and a yaw-axis motor 3), a yaw-axis arm 5, a load fixation device 6 (including an inertial measurement unit), a pitch-axis arm 7, a roll-axis arm 8, and a load 9. FIG. 2 shows an example where the load is a photographing device. The pitch-axis motor 1 is mounted at the pitch-axis arm 7, the roll-axis motor 2 is mounted at the roll-axis arm 8, and the yaw-axis motor 3 is mounted at the yaw-axis arm 5. The gimbal base can be disposed above the yaw-axis motor 3, and the gimbal base can be provided with a gyroscope to assist an intelligent following of the gimbal.

The naming of various components of the above-described gimbal is only for identification purposes, which should not be understood as a limitation to the embodiments of the present disclosure. The gimbal may include all or some of the above components.

Figure 3:
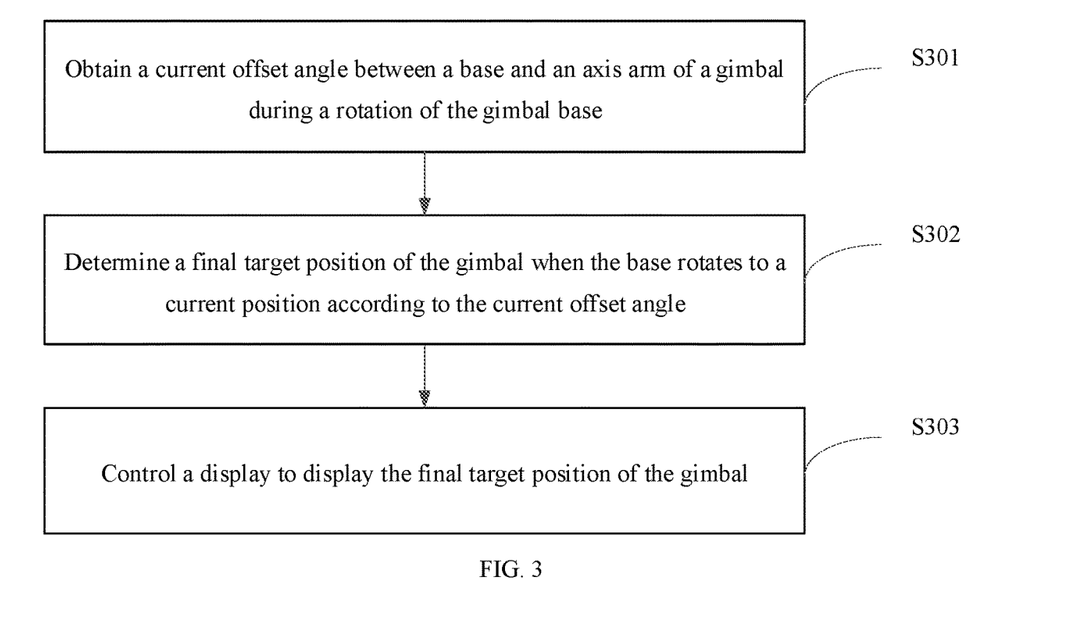
FIG. 3 is a flowchart of a method for marking a target position of a gimbal according to an embodiment of the disclosure.

FIG. 3 is a flowchart of a method for marking a target position of a gimbal according to an embodiment of the present disclosure. The method shown in FIG. 3 can be applied to the gimbal. As shown in FIG. 3, the method includes the following.

During a rotation of the gimbal base, a current offset angle between the base and the axis arm of the gimbal is obtained (S301).

In some embodiments, during the rotation of the gimbal base, the current offset angle between the base and any axis arm of the gimbal can be obtained.

For example, when a sensing device at the gimbal detects the rotation of the gimbal base, the current offset angle between the base and the axis arm of the gimbal can be obtained in real time.

In some implementation manners, during the rotation of the gimbal base, a current offset angle between the base and the pitch-axis arm of the gimbal is obtained, or a current offset angle between the base and the roll-axis arm of the gimbal is obtained, or a current offset angle between the yaw-axis arm of the gimbal is obtained. The current offset angle may be, for example, an offset angle between a normal line of the base and one of the pitch-axis arm, the roll-axis arm, or the yaw-axis arm of the gimbal. For example, included angle 1 between the base and the axis arm before the base rotates is obtained, and included angle 2 between the base and the axis arm during the rotation of the base is obtained. The current offset angle between the base and the axis arm during the rotation of the base can be obtained according to included angle 1 and included angle 2.

In some implementation manners, during the rotation of the gimbal base, the current offset angles between the base and the pitch-axis arm and the roll-axis arm of the gimbal are obtained, the current offset angles between the base and the pitch-axis arm and the yaw-axis arm of the gimbal are obtained, or the current offset angles between the base and the roll-axis arm and the yaw-axis arm of the gimbal are obtained.

In some implementation manners, during the rotation of the gimbal base, the current offset angles between the base and the pitch-axis arm, the roll-axis arm, and the yaw-axis arm of the gimbal are obtained.

In some other implementation manners, the current offset angle between the base and the axis arm may also be determined according to a rotation angle of a motor mounted at the axis arm. For example, rotation angle 1 of the motor before the base rotates is obtained, and rotation angle 2 of the motor during the rotation of the base is obtained. The current offset angle between the base and the axis arm can be obtained according to rotation angle 1 and rotation angle 2.

In some implementation manners, if a first inertial measurement unit (IMU) is provided at the base and a second IMU is provided at the axis arm of the gimbal, a current angle of the base is obtained from the first IMU, a current angle of the axis arm is obtained from the second IMU, and the current offset angle is determined according to the current angle of the base and the current angle of the axis arm.

The first IMU is used to measure the current angle (triaxial attitude angle) of the base, and the second IMU is used to measure the current angle (triaxial attitude angle) of the axis arm. The current offset angle is determined according to the current angle of the based and the current angle of the axis arm. For example, the current offset angle between the base and the axis arm is obtained by calculating a difference between the current angle of the base and the current angle of the axis arm.

In some embodiments, at least one of the pitch-axis arm, the roll-axis arm, or the yaw-axis arm of the gimbal is provided with a second IMU. In this way, the current offset angle between the base and the pitch-axis arm can be determined according to measured values of the first IMU at the base and the second IMU at the pitch-axis arm. In some embodiments, the current offset angle between the base and the roll-axis arm is determined according to measured values of the first IMU at the base and the second IMU at the roll-axis arm. In some embodiments, the current offset angle between the base and the yaw-axis arm is determined according to measured values of the first IMU at the base and the second IMU at the yaw-axis arm.

A final target position of the gimbal when the base rotates to a current position is determined according to the current offset angle (S302). The final target position of the gimbal refers to the final position at the end of the gimbal's movement, i.e., when the gimbal stops.

When a handheld gimbal is in a mode such as a following mode, due to a need for stabilization, there is a positional delay between the movement of the gimbal and an action of a gimbal user. When the gimbal user rotates the base, the angle of the base changes. The gimbal starts and stops slowly to eliminate an angle increment of the base, so as to achieve a following control. In this way, there will be a positional delay between the movement of the gimbal and the movement of the base, so the gimbal user cannot accurately know the target position when the gimbal is in a final steady state.

In some embodiments, the current offset angle between the base and the axis arm during the rotation of the base is obtained according to the above processes, and then, according to the current offset angle, the final target position of the gimbal is determined when the base rotates to the current position.

In some embodiments, a current location of the normal line of the base when the base rotates to the current position can be obtained according to the current offset angle obtained above. According to the current location of the normal line, the final target position of the gimbal when the base rotates to the current position is determined. For example, an intersection of the normal line and an imaging plane of a photographing device mounted at the gimbal is used as the final target position of the gimbal.

In some embodiments, a current position of the axis arm when the base rotates to the current position can be obtained according to the current offset angle obtained above. According to the current position of the axis arm, the final target position of the gimbal when the base rotates to the current position is determined.

In some embodiments, during the rotation of the base, the current offset angle between the base and the axis arm is obtained, and the final target position of the gimbal when the base rotates to the current position is determined according to the current offset angle, thereby realizing an accurate determination of the final target position of the gimbal and preventing a movement delay between the base and the gimbal when the base rotates, which results in an inability to accurately know the final target position when the gimbal is in a final steady state. Further, a control accuracy of the gimbal and a shooting accuracy are improved.

A display is controlled to display the final target position of the gimbal (S303).

In some embodiments, in order to facilitate an operation of the gimbal by a gimbal user, after the final target position of the gimbal is determined when the base rotates to the current position according to the above processes, the display is also controlled to display the final target position of the gimbal, so that the gimbal user can intuitively perceive.

In some embodiments, the display may be disposed at the gimbal, and the final target position of the gimbal is displayed at the photographing device. The display and the photographing device may be integrated in a same device, or the display and the photographing device are two independent devices.

In some embodiments, the display may also be a handheld device, such as a mobile phone, a computer, a remote control device, or the like.

In the method for marking the target position of the gimbal provided in this disclosure, the current offset angle between the base and the axis arm of the gimbal is obtained during the rotation of the gimbal base, and according to the current offset angle, the final target position of the gimbal when the base rotates to the current position is determined. Therefore, the problem of the inability to accurately know the target position of the gimbal in the final steady state due to the movement delay between the base and the gimbal when the base rotates is solved, thereby improving the control accuracy of the gimbal and the shooting accuracy by using the gimbal.

Figure 4:
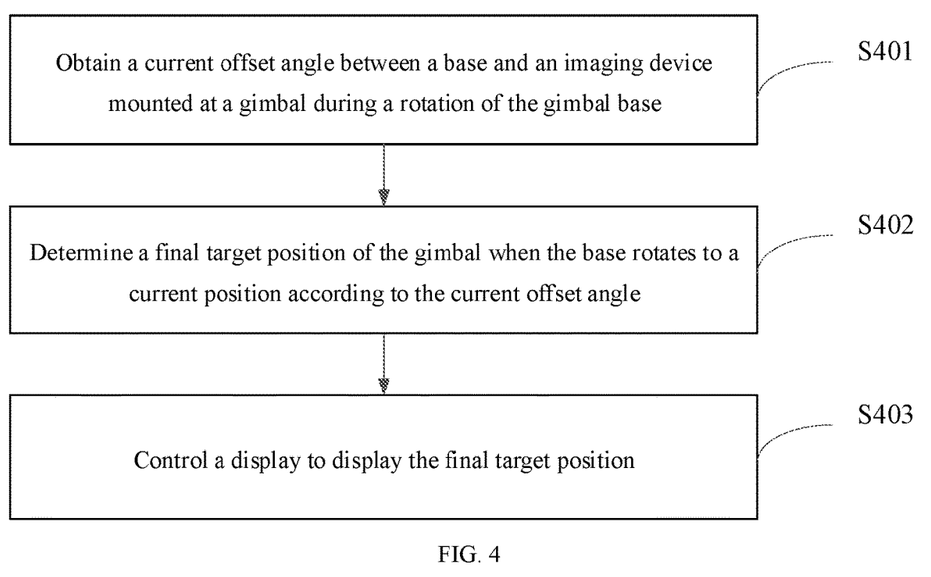
FIG. 4 is a flowchart of a method for marking a target position of a gimbal according to an embodiment of the disclosure.

FIG. 4 is a flowchart of a method for marking a target position of a gimbal according to an embodiment of the present disclosure. The method is applied to a photographing device, and the photographing device includes a gimbal and an imaging device. As shown in FIG. 4, the method includes the following.

During a rotation of a gimbal base, a current offset angle between the base and the imaging device mounted at the gimbal is obtained (S401).

As shown in FIG. 2, the imaging device is mounted at the gimbal, and the current offset angle between the base and the imaging device is obtained during the rotation of the gimbal base. For example, an angle between a normal line of the base and an optical axis of the imaging device is used as the current offset angle between the base and the imaging device.

A final target position of the gimbal when the base rotates to a current position is determined according to the current offset angle (S402).

A display is controlled to display the final target position (S403).

The implementation of S402 to S403 is similar to that of the above-described embodiments, and a reference can be made to the description of the above-described embodiments, which is not repeated here.

In the method for marking the target position of the gimbal provided in this disclosure, the current offset angle between the base and the imaging device mounted at the gimbal is obtained during the rotation of the gimbal base, and according to the current offset angle, the final target position of the gimbal when the base rotates to the current position is determined. Therefore, the problem of the inability to accurately know the target position of the gimbal in the final steady state due to the movement delay between the base and the gimbal when the base rotates is solved, thereby improving the control accuracy of the gimbal and the shooting accuracy by using the gimbal.

In some embodiments, during the rotation of the gimbal base, the current offset angle (the current offset angle between the base and the axis arm of the gimbal, or the current offset angle between the base and the imaging device mounted at the gimbal) is obtained by obtaining a current rotation angle of at least one motor of the gimbal, where the at least one motor includes one or more of a pitch-axis motor, a roll-axis motor, and a yaw-axis motor, and determining the current offset angle according to the current rotation angle of the at least one motor.

The motor of the gimbal may include a pitch-axis motor, a roll-axis motor, or a yaw-axis motor.

A rotation of the pitch-axis motor of the gimbal can control a pitch angle of the gimbal, a rotation of the roll-axis motor of the gimbal can control a roll angle of the gimbal, and a rotation of the yaw-axis motor of the gimbal can control a yaw angle of the gimbal.

In some embodiments, an angular velocity of the pitch-axis motor, an angular velocity of the roll-axis motor, and an angular velocity of the yaw-axis motor are obtained first, and then, according to the angular velocity of the pitch-axis motor, the angular velocity of the roll-axis motor, and the angular velocity of the yaw-axis motor, the rotation angle of the pitch-axis motor, the rotation angle of the roll-axis motor, and the rotation angle of the yaw-axis motor are obtained. That is, the rotation angle of pitch-axis motor is obtained according to the angular velocity of the pitch-axis motor, the rotation angle of the roll-axis motor is obtained according to the angular velocity of the roll-axis motor, and the rotation angle of the yaw-axis motor is obtained according to the angular velocity of the yaw-axis motor.

For example, the angular velocity of the pitch-axis motor, the angular velocity of the roll-axis motor, and the angular velocity of the yaw-axis motor can be differentiated to obtain the rotation angle of the pitch-axis motor, the rotation angle of the roll-axis motor, and the rotation angle of the yaw-axis motor. That is, the angular velocity of the pitch-axis motor is differentiated to obtain the rotation angle of the pitch-axis motor, the angular velocity of the roll-axis motor is differentiated to obtain the rotation angle of the roll-axis motor, and the angular velocity of the yaw-axis motor is differentiated to obtain the rotation angle of the yaw-axis motor.

In some embodiments, the current rotation angle of the at least one motor is determined according to a sensor of the at least one motor. The sensor can be an angle sensor or a potentiometer. In some embodiments, the angle sensor may be a Hall sensor.

For example, three motor angle sensors detect the rotation angle of the pitch-axis motor, the rotation angle of the roll-axis motor, and the rotation angle of the yaw-axis motor, that is, one motor angle sensor detects the rotation angle of the pitch-axis motor, one motor angle sensor detects the rotation angle of the roll-axis motor, and another motor angle sensor detects the rotation angle of the yaw-axis motor.

In some embodiments, the current rotation angle of the at least one motor of the gimbal can be obtained according to the above method, and then, the current offset angle is determined according to the current rotation angle of the at least one motor.

In some embodiments, angle 1 of the at least one motor (for example, the pitch-axis motor) is obtained before the gimbal rotates, and when the gimbal rotates to the current position, angle 2 of the pitch-axis motor, a rotation speed of the pitch-axis motor, and a delay time between the movements of the base and the gimbal are obtained. According to the above parameters, the current offset angle can be obtained. For example, according to the rotation speed of the motor, time 3 for the motor to rotate from angle 1 to angle 2 can be obtained. Then, according to delay time 4 between the movements of the base and the gimbal, and time 3, remaining time 5 can be obtained. According to remaining time 5 and the rotation speed of the motor, rotation angle 6 of the motor can be obtained in the remaining time. In this way, according to angle 6 and angle 2, the current offset angle can be obtained.

In some embodiments, for a process of obtaining the current rotation angle of the motor of the gimbal and determining the current offset angle according to the current rotation angle of the motor, a reference can be made to the description of the above-described embodiments.

In some embodiments, the current rotation angles of two or three motors of the gimbal can be obtained. The current offset angle corresponding to a motor is obtained according to the current rotation angle of the motor. Then, the current offset angle corresponding to the motor is processed to obtain the current offset angle. For example, an average value of the current offset angles of various motors is used as the current offset angle.

In some embodiments, one possible implementation manner of determining the current offset angle according to the current rotation angle of the at least one motor is superposing the current rotation angle of the at least one motor and a rotation angle of the base to determine the current offset angle.

In some embodiments, the current rotation angle of the at least one motor is obtained according to the above method, and the rotation angle of the base when the base rotates to the current position is obtained. The rotation angle of the base can be obtained from a sensor at the base. Then, the current offset angle between the base and the axis arm is determined by superposing the current rotation angle of the at least one motor and the rotation angle of the base. For example, the current rotation angles of the various motors are superposed with the rotation angle of the base, and the average of the superposed values is used as the current offset angle between the base and the axis arm.

In some embodiments, during the rotation of the gimbal base, obtaining the current offset angle between the base and the axis arm of the gimbal may include obtaining the current angle of the base from the first IMU, obtaining the current angle of the axis arm from the second IMU, and determining the current offset angle according to the current angle of the base and the current angle of the axis arm. The first IMU is disposed at the base, and the second IMU is disposed at the axis arm. For the specific process, a reference can be made to the description of the foregoing embodiments, which is not repeated here.

In some embodiments, the method for determining the final target position of the gimbal when the base rotates to the current position according to the current offset angle may include determining a current intersection point between the normal line of the base and the imaging plane of the imaging device mounted at the gimbal according to the current offset angle. Then, according to the current intersection point, the final target position of the gimbal when the base rotates to the current position is determined.

As shown in FIG. 2, the gimbal of the embodiments is provided with an imaging device.

In some embodiments, according to the current offset angle, the current location of the normal line of the base can be determined, and the normal line of the base at the current location is extended to intersect the imaging plane of the imaging device to obtain the current intersection point.

In some embodiments, an implementation manner of determining the current intersection point of the normal line of the base and the imaging plane of the imaging device according to the current offset angle may be obtaining a horizontal rotation angle and a vertical rotation angle of the current offset angle in the imaging plane according to the current offset angle, and determining the current intersection point of the normal line of the base and the imaging plane of the imaging device according to the horizontal rotation angle and the vertical rotation angle.

Figure 5:
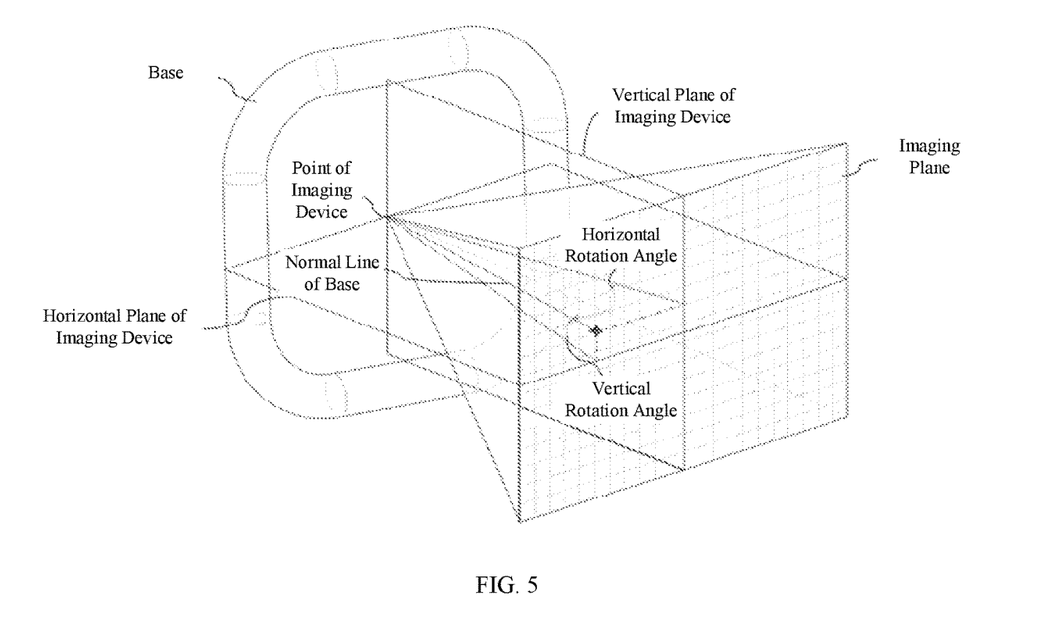
FIG. 5 is a schematic diagram showing a base and an imaging plane of a photographing device according to an embodiment of the disclosure.

As shown in FIG. 5, the current offset angle is decomposed horizontally and vertically to obtain its horizontal rotation angle (that is, a horizontal rotation angle of the base) and vertical rotation angle (that is, a vertical rotation angle of the base) at the imaging plane.

According to the horizontal rotation angle and the vertical rotation angle obtained above, the current intersection point of the normal line of the base and the imaging plane of the imaging device is determined. For example, before the base rotates, an initial location of the normal line of the base is obtained, and according to the horizontal rotation angle and the vertical rotation angle, after the normal line rotates from the initial location to the location of the horizontal rotation angle and the vertical rotation angle, a final location of the normal line of the base is obtained. At the final location, an intersection point of the normal line of the base and the imaging plane of the imaging device is marked as the current intersection point of the normal line of the base and the imaging plane of the imaging device.

In some implementation manners, determining the current intersection point between the normal line of the base and the imaging plane of the imaging device according to the horizontal rotation angle and the vertical rotation angle can be obtaining a straight line along a direction of an optical axis of the imaging device with a center point of the imaging device as a starting point, rotating the straight line around the starting point horizontally by the horizontal rotation angle and vertically by the vertical rotation angle to obtain a rotated straight line, and determining an intersection point between the rotated straight line and the imaging plane as the current intersection point of the normal line of the base and the imaging plane of the imaging device.

As shown in FIG. 5, the straight line is obtained along the direction of the optical axis of the imaging device with the center point of the imaging device as the starting point. The straight line rotates around the starting point horizontally by the horizontal rotation angle, and then vertically by the vertical rotation angle to obtain the rotated straight line. The intersection point between the rotated straight line and the imaging plane is determined as the current intersection point between the normal line of the base and the imaging plane of the imaging device.

In some embodiments, the current intersection point may be used as the final target position of the gimbal when the base rotates to the current position.

In some embodiments, an implementation manner of controlling the display to display the final target position of the gimbal may be marking the final target position of the gimbal at an image of the imaging device. Then, the display is controlled to display the image.

Figure 6:
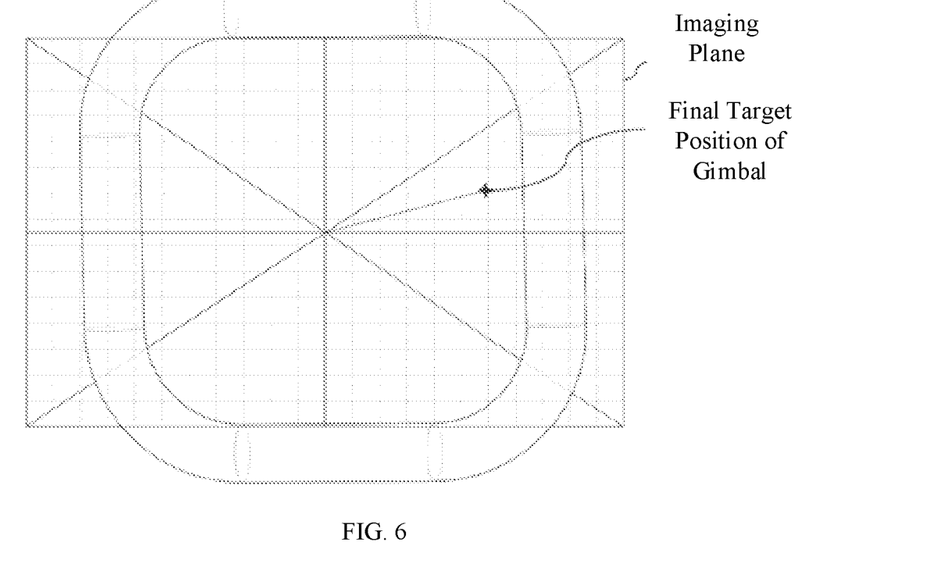
FIG. 6 is a schematic diagram showing a final target position of a gimbal displayed at an imaging plane.

As shown in FIG. 6, the final target position of the gimbal when the base rotates to the current position is marked at the image of the imaging device. The display is controlled to display the image, for example, the imaging device is controlled to display the image on its display screen.

The final target position of the gimbal is used to indicate a center position of the image when the movement of the gimbal stops.

In some embodiments, a display form of the final target position of the gimbal at the display may be a form of displaying parameters. For example, coordinate position information of the final target position of the gimbal is displayed.

In some embodiments, the display form of the final target position of the gimbal at the display may also be controlling the display to display a preset marker. The preset marker is used to mark the final target position of the gimbal. As shown in FIG. 6, a preset marker "+" is used to mark the final target position of the gimbal, and the marker "+" is displayed at the display.

In some embodiments, after the final target position of the gimbal when the base rotates to the current position is determined according to the current offset angle, the embodiments may further include controlling the display to display a preset range according to the final target position. The preset range is used to indicate that the final target position of the gimbal is located within the preset range.

Figure 7:
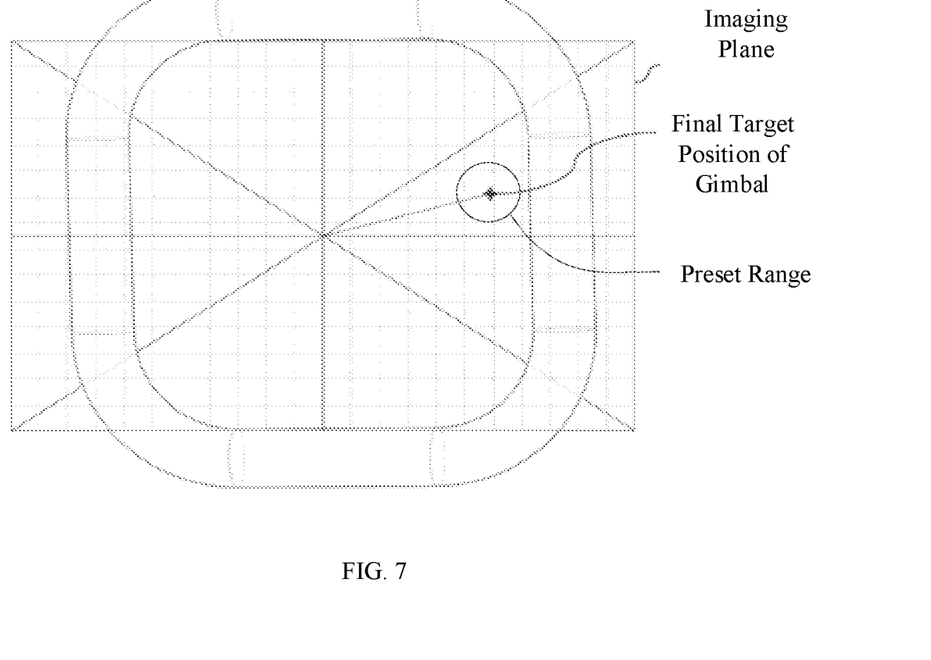
FIG. 7 is a schematic diagram showing a final target position of a gimbal and a preset range of the gimbal's movement displayed at an imaging plane.

In some embodiments, when a gimbal user performs a long-time operation with a fixed rotation speed such as a continuous panoramic shooting, there is always an angle between the optical axis of the imaging device and the normal line of the base, and the angle slowly disappears after the base stops rotating. The angle is defined as a dead zone. As shown in FIG. 7, the dead zone can be drawn around the preset marker as a reference to assist the gimbal user to accurately keep a shooting target somewhere in the image. That is, with the final target position as the center, the preset range is set, and the display is controlled to display the preset range.

In some embodiments, the preset range may be a circle or a square centered at the current intersection point.

A computer storage medium is provided according to an embodiment of the present disclosure. The computer storage medium stores program instructions, and when the program is executed, all or some of the processes of the method for marking the target position of the gimbal in the foregoing embodiments are performed.

Figure 8:
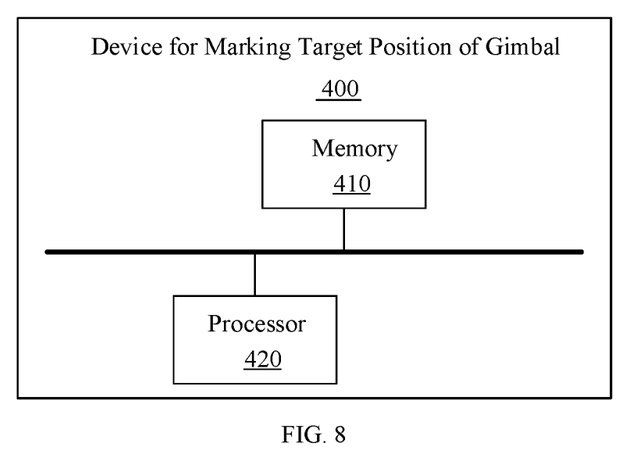
FIG. 8 is a schematic structural diagram of a device for marking a target position of a gimbal according to an embodiment of the disclosure.

FIG. 8 is a schematic structural diagram of a device for marking a target position of a gimbal according to an embodiment of the disclosure. As shown in FIG. 8, the device 400 for marking the target position of the gimbal of the disclosure includes a memory 410 and a processor 420. The memory 410 is coupled with the processor 420.

The memory 410 is used to store program instructions.

The processor 420 is configured to execute the program instructions in the memory 410 to perform a method consistent with the disclosure, such as one of the above-described example methods.

The device for marking the target position of the gimbal in this disclosure can be used to implement the technical solutions in the foregoing method embodiments. The implementation principles and technical effects are similar and are not repeated here.

Figure 9:
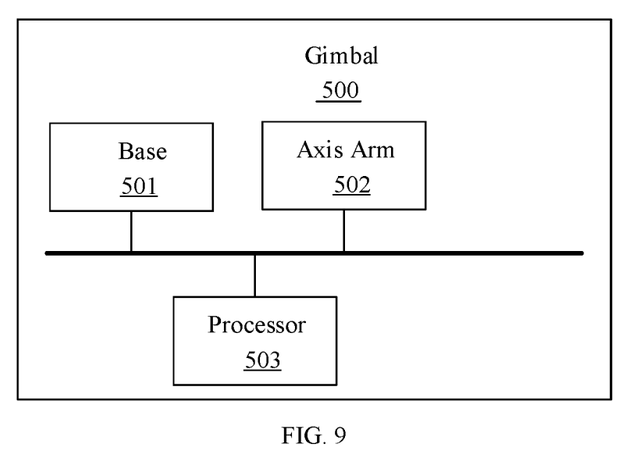
FIG. 9 is a schematic structural diagram of a gimbal according to an embodiment of the disclosure.

FIG. 9 is a schematic structural diagram of a gimbal according to an embodiment of the disclosure. As shown in FIG. 9, the gimbal 500 includes a base 501, an axis arm 502, and a processor 503. The processor 503 are communicatively connected with the base 501 and the axis arm 502.

The processor 503 is configured to obtain a current offset angle between the base 501 and the axis arm 502 during a rotation of the gimbal base 501, determine a final target position of a gimbal when the base 501 rotates to a current position according to the current offset angle, and control a display to display the final target position of the gimbal.

The gimbal in the embodiments can be used to implement the technical solutions in the foregoing method embodiments. The implementation principles and technical effects are similar and are not repeated here.

Figure 10:
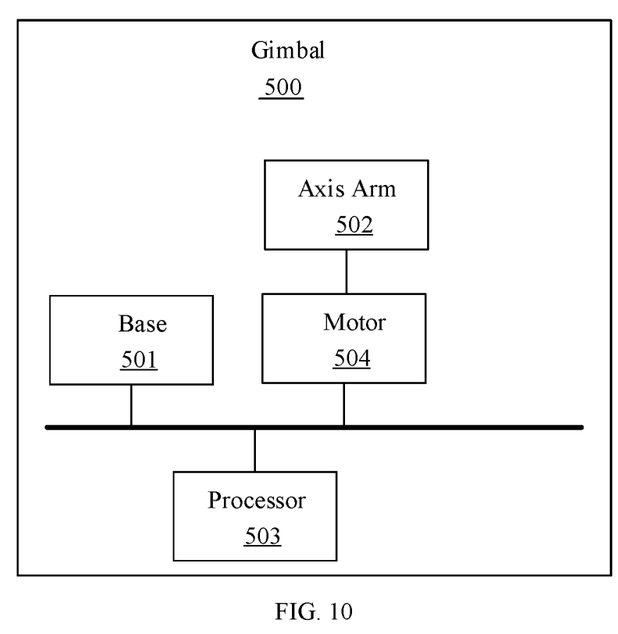
FIG. 10 is a schematic structural diagram of a gimbal according to another embodiment of the disclosure.

FIG. 10 is a schematic structural diagram of a gimbal according to another embodiment of the disclosure. As shown in FIG. 10, the gimbal further includes at least one motor 504, and the processor 503 is communicatively connected with the at least one motor 504.

When obtaining the current offset angle between the base 501 and the axis arm of the gimbal, the processor 503 is configured to obtain a current rotation angle of the at least one motor 504 of the gimbal, where the at least one motor 504 includes one or more of a pitch-axis motor 504, a roll-axis motor 504, and a yaw-axis motor 504, and determine the current offset angle according to the current rotation angle of the at least one motor 504.

In some embodiments, when obtaining the current rotation angle of the at least one motor 504 of the gimbal, the processor 503 is configured to determine the current rotation angle of the at least one motor 504 according to a torque output by the at least one motor 504.

In some embodiments, when determining the current offset angle according to the current rotation angle of the at least one motor 504, the processor 503 is configured to superpose the current rotation angle of the at least one motor 504 and a rotation angle of the base 501 to determine the current offset angle.

In some embodiments, when determining the final target position of the gimbal when the base 501 rotates to a current position according to the current offset angle, the processor 503 is configured to determine a current intersection point of a normal line of the base 501 and an imaging plane of an imaging device mounted at the gimbal according to the current offset angle, and determine the final target position of the gimbal when the base 501 rotates to the current position according to the current intersection point.

In some embodiments, when controlling a display to display the final target position of the gimbal, the processor 503 is configured to mark the final target position of the gimbal at an image of the imaging device and control the display to display the image.

In some embodiments, the final target position of the gimbal is used to indicate a center point of the image when the movement of the gimbal stops.

The gimbal in the embodiments can be used to implement the technical solutions in the foregoing method embodiments. The implementation principles and technical effects are similar and are not repeated here.

Figure 11:
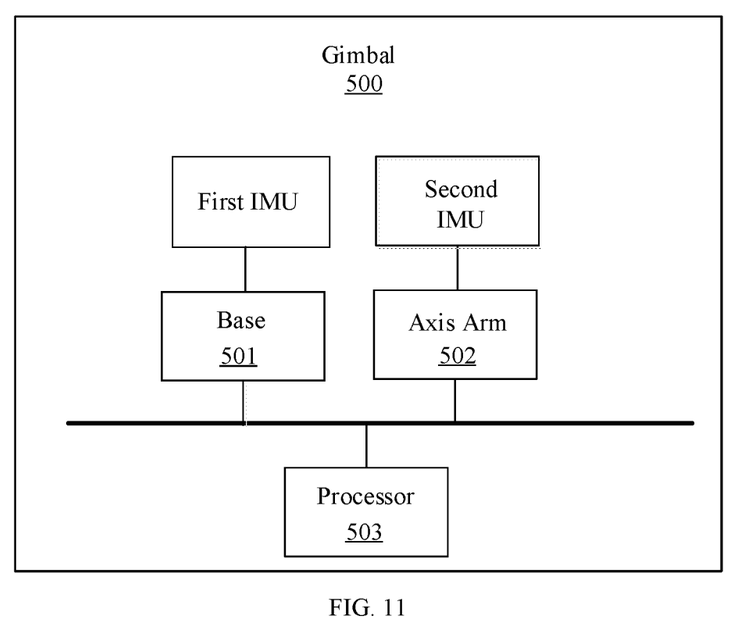
FIG. 11 is a schematic structural diagram of a gimbal according to another embodiment of the disclosure.

FIG. 11 is a schematic structural diagram of a gimbal according to another embodiment of the present disclosure. As shown in FIG. 11, a first inertial measurement unit (IMU) is disposed at the base, and a second IMU is disposed at the axis arm of the gimbal. The processor 503 is communicatively connected with the first IMU and the second IMU.

When obtaining the current offset angle between the base and the axis arm of the gimbal, the processor 503 is configured to obtain a current angle of the base from the first IMU, obtain a current angle of the axis arm from the second IMU, and determine the current offset angle according to the current angle of the base and the current angle of the axis arm.

In some embodiments, when determining the current intersection point of the normal line of the base 501 and the imaging plane of the imaging device according to the current offset angle, the processor 503 is configured to obtain a horizontal rotation angle and a vertical rotation angle of the current offset angle at the imaging plane according to the current offset angle, and determine the current intersection point of the normal line of the base 501 and the imaging plane of the imaging device according to the horizontal rotation angle and the vertical rotation angle.

In some embodiments, when determining the current intersection point between the normal line of the base 501 and the imaging plane of the imaging device according to the horizontal rotation angle and the vertical rotation angle, the processor 503 is configured to obtain a straight line along a direction of an optical axis of the imaging device with a center point of the imaging device as a starting point, rotate the straight line around the starting point horizontally by the horizontal rotation angle and vertically by the vertical rotation angle to obtain a rotated straight line, and determine an intersection point between the rotated straight line and the imaging plane as the current intersection point of the normal line of the base 501 and the imaging plane of the imaging device.

In some embodiments, when controlling the display to display the final target position of the gimbal, the processor 503 is configured to control the display to display a preset marker. The preset marker is used to mark the final target position of the gimbal.

In some embodiments, after determining the final target position of the gimbal when the base 501 rotates to the current position according to the current offset angle, the processor 503 is further configured to control the display to display a preset range according to the final target position. The preset range is used to indicate that the final target position of the gimbal is located within the preset range.

In some embodiments, the preset range may be a circle or a square centered at the current intersection point.

The gimbal in the embodiments can be used to implement the technical solutions in the foregoing method embodiments. The implementation principles and technical effects are similar and are not repeated here.

Figure 12:
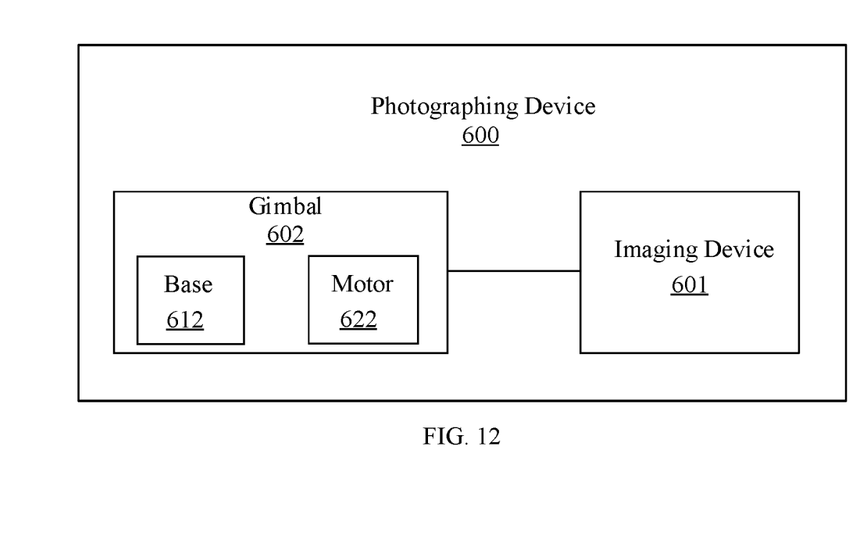
FIG. 12 is a schematic structural diagram of a photographing device according to an embodiment of the disclosure.

FIG. 12 is a schematic structural diagram of a photographing device according to an embodiment of the present disclosure. As shown in FIG. 12, the photographing device 600 of the embodiments includes a gimbal 602 and an imaging device 601. The gimbal 602 and the imaging device 601 are in a communication connection, and the imaging device 601 is mounted at the gimbal 602.

The gimbal 602 is configured to, during a rotation of a base 612 of the gimbal 602, obtain a current offset angle between the base 612 and the photographing device 601, determine a final target position of a gimbal 602 when the base 612 rotates to a current position according to the current offset angle, and control a display to display the final target position.

In some embodiments, when the current offset angle between the base 612 and the photographing device 601 mounted at the gimbal 602 is obtained, the gimbal 602 is configured to obtain a current rotation angle of at least one motor 622 of the gimbal 602 respectively, where the at least one motor 622 includes one or more of a pitch-axis motor, a roll-axis motor, and a yaw-axis motor, and determine the current offset angle according to the current rotation angle of the at least one motor 622.

In some embodiments, when the current rotation angle of the at least one motor 622 of the gimbal 602 is obtained respectively, the gimbal 602 is configured to determine the current rotation angle of the at least one motor 622 according to a torque output by the at least one motor 622.

In some embodiments, when the current offset angle is determined according to the current rotation angle of the at least one motor 622, the gimbal 602 is configured to superpose the current rotation angle of the at least one motor 622 and a rotation angle of the base 612 to determine the current offset angle.

In some embodiments, a first inertial measurement unit (IMU) is disposed at the base 612, and a second IMU is disposed at the axis arm. A processor is communicatively connected with the first IMU and the second IMU.

When obtaining the current offset angle between the base 612 and the axis arm of the gimbal 602, the processor 503 is configured to obtain a current angle of the base 612 from the first IMU, obtain a current angle of the axis arm from the second IMU, and determine the current offset angle according to the current angle of the base 612 and the current angle of the axis arm.

In some embodiments, when the final target position of the gimbal 602 when the base 612 rotates to a current position is determined according to the current offset angle, the gimbal 602 is configured to determine a current intersection point of a normal line of the base 612 and an imaging plane of the imaging device 601 according to the current offset angle, and determine the final target position of the gimbal 602 when the base 612 rotates to the current position according to the current intersection point.

In some embodiments, when the display is controlled to display the final target position, the gimbal 602 is configured to mark the final target position of the gimbal at an image of the imaging device 601 and control the display to display the image.

In some embodiments, the final target position of the gimbal is used to indicate a center point of the image when the movement of the gimbal 602 stops.

In some embodiments, when determining the current intersection point of the normal line of the base 612 and the imaging plane of the imaging device 601 according to the current offset angle, the gimbal 602 is configured to obtain a horizontal rotation angle and a vertical rotation angle of the current offset angle at the imaging plane according to the current offset angle, and determine the current intersection point of the normal line of the base 612 and the imaging plane of the imaging device 601 according to the horizontal rotation angle and the vertical rotation angle.

In some embodiments, when determining the current intersection point between the normal line of the base 612 and the imaging plane of the imaging device 601 according to the horizontal rotation angle and the vertical rotation angle, the gimbal 602 is configured to obtain a straight line along a direction of an optical axis of the imaging device 601 with a center point of the imaging device 601 as a starting point, rotate the straight line around the starting point horizontally by the horizontal rotation angle and vertically by the vertical rotation angle to obtain a rotated straight line, and determine an intersection point between the rotated straight line and the imaging plane as the current intersection point of the normal line of the base 612 and the imaging plane of the imaging device 601.

In some embodiments, when controlling the display to display the final target position, the gimbal 602 is configured to control the display to display a preset marker. The preset marker is used to mark the final target position of the gimbal 602.

In some embodiments, after determining the final target position of the gimbal 602 when the base 612 rotates to the current position according to the current offset angle, the gimbal 602 is further configured to control the display to display a preset range according to the final target position. The preset range is used to indicate that the final target position of the gimbal 602 is located within the preset range.

In some embodiments, the preset range may be a circle or a square centered at the current intersection point.

The photographing device in the embodiments can be used to implement the technical solutions in the foregoing method embodiments. The implementation principles and technical effects are similar and are not repeated here.

A person of ordinary skill in the art can understand that all or part of the processes in the above method embodiments can be implemented by a program instructing relevant hardware. The program can be stored in a computer-readable storage medium. When the program is executed, the processes of the foregoing method embodiments are performed. The storage medium includes a medium that can store program codes such as a read-only memory (ROM), a random access memory (RAM), a magnetic disk, an optical disks, or the like.

The above embodiments are only used to illustrate the technical solutions of the present disclosure, but not to limit them. Although the present disclosure has been described in detail with reference to the above-described embodiments, those of ordinary skill in the art should understand it is still possible to modify the technical solutions described in the foregoing embodiments, or equivalently replace some or all of the technical features. These modifications or replacements do not make the essence of the corresponding technical solutions deviate from the technical solutions of the embodiments of the present disclosure.

What is claimed is:

1. A method for marking a target position of a gimbal comprising:
    obtaining a current offset angle between a base of the gimbal and an axis arm of the gimbal during rotation of the base;
    determining a final target position of the gimbal when the base rotates to a current position according to the current offset angle; and
    displaying the final target position, including displaying a preset marker to mark the final target position on a display.

2. The method of claim 1, wherein obtaining the current offset angle between the base and the axis arm includes:
    obtaining a current rotation angle of a motor of the gimbal, the motor including a pitch-axis motor, a roll-axis motor, or a yaw-axis motor; and
    determining the current offset angle according to the current rotation angle of the motor.

3. The method of claim 2, wherein obtaining the current rotation angle of the motor includes:
    determining the current rotation angle of the motor according to a sensor of the motor.

4. The method of claim 2, wherein determining the current offset angle according to the current rotation angle of the motor includes:
    superposing the current rotation angle of the motor to a rotation angle of the base to determine the current offset angle.

5. The method of claim 1, wherein obtaining the current offset angle between the base and the axis arm includes:
    obtaining a current angle of the base from a first inertial measurement unit (IMU) disposed at the base;
    obtaining a current angle of the axis arm from a second IMU disposed at the axis arm; and
    determining the current offset angle according to the current angle of the base and the current angle of the axis arm.

6. The method of claim 1, wherein determining the final target position when the base rotates to the current position includes:
    determining a current intersection point of a normal line of the base and an imaging plane of an imaging device mounted at the gimbal according to the current offset angle; and
    determining the final target position when the base rotates to the current position according to the current intersection point.

7. The method of claim 6, wherein displaying the final target position further includes:
    marking the final target position at an image of the imaging device; and
    controlling the display to display the image.

8. The method of claim 7, wherein the final target position is configured to indicate a center point of the image when the gimbal stops moving.

9. The method of claim 6, wherein determining the current intersection point includes:
    obtaining a horizontal rotation angle and a vertical rotation angle of the current offset angle at the imaging plane; and
    determining the current intersection point according to the horizontal rotation angle and the vertical rotation angle.

10. The method of claim 9, wherein determining the current intersection point according to the horizontal rotation angle and the vertical rotation angle includes:
    obtaining a straight line along a direction of an optical axis of the imaging device with a center point of the imaging device as a starting point;
    rotating the straight line around the starting point horizontally by the horizontal rotation angle and vertically by the vertical rotation angle to obtain a rotated straight line; and
    determining an intersection point between the rotated straight line and the imaging plane as the current intersection point of the normal line of the base and the imaging plane.

11. The method of claim 1, further comprising, after determining the final target position:
    displaying a preset range according to the final target position, the final target position being located within the preset range.

12. The method of claim 11, wherein the preset range includes a circle or a square centered at a current intersection point of a normal line of the base and an imaging plane of an imaging device mounted at the gimbal.

13. A method for marking a target position of a gimbal comprising:
    during rotation of a base of the gimbal, obtaining a current offset angle between the base and a photographing device mounted at the gimbal, including:
        obtaining a current rotation angle of a motor of the gimbal; and determining the current offset angle according to the current rotation angle of the motor, including superposing the current rotation angle of the motor to a rotation angle of the base to determine the current offset angle;

determining a final target position of the gimbal when the base rotates to a current position according to the current offset angle; and displaying the final target position.

14. The method of claim 13, wherein
the motor includes a pitch-axis motor, a roll-axis motor, or a yaw-axis motor.

15. The method of claim 13, wherein obtaining the current rotation angle of the motor includes:

determining the current rotation angle of the motor according to a torque output by the motor.

16. A gimbal comprising:
a base;
an axis arm; and
a processor communicatively connected to the base and the axis arm, and configured to:

obtain a current offset angle between the base and the axis arm during rotation of the base;

determine a final target position of the gimbal when the base rotates to a current position according to the current offset angle; and display the final target position, including displaying a preset marker to mark the final target position on a display.

17. The gimbal of claim 16, further comprising:
a motor configured to rotate the axis arm and including a pitch-axis motor, a roll-axis motor, or a yaw-axis motor;

wherein the processor is communicatively connected to the motor and further configured to:
obtain a current rotation angle of the motor; and
determine the current offset angle according to the current rotation angle of the motor.

18. The gimbal of claim 17, wherein the processor is further configured to:

determine the current rotation angle of the motor according to a torque output by the motor.

* * * * *